United States Patent [19]

Kilham

[11] 4,328,765
[45] May 11, 1982

[54] BIRD FEEDER PERCH

[76] Inventor: Peter Kilham, Mill Rd., Box 98, Foster, R.I. 02825

[21] Appl. No.: 257,907

[22] Filed: Apr. 27, 1981

[51] Int. Cl.³ .................. A01K 31/12; A01K 31/00
[52] U.S. Cl. .................................... 119/51 R; 119/63
[58] Field of Search .................. 119/24, 25, 26, 51 R, 119/52 R, 59, 63

[56] References Cited

U.S. PATENT DOCUMENTS

| | | | |
|---|---|---|---|
| 2,775,226 | 12/1956 | Early | 119/51 R |
| 3,040,706 | 6/1962 | O'Dell | 119/51 R |
| 3,124,103 | 3/1964 | Stainbrook | 119/63 |
| 3,126,870 | 3/1964 | Matthew | 119/63 |
| 3,186,379 | 6/1965 | Grella | 119/51 R |
| 3,568,641 | 3/1971 | Kilham | 119/51 R |
| 3,738,328 | 6/1973 | Schweitzer | 119/63 |
| 4,144,842 | 3/1979 | Schlising | 119/63 |
| 4,188,913 | 2/1980 | Earl et al. | 119/51 R |

Primary Examiner—Paul J. Hirsch
Attorney, Agent, or Firm—Salter & Michaelson

[57] ABSTRACT

A perch for bird feeders and the like of the type comprising a vertically disposed housing having feed therein and an aperture extending therethrough for permitting access by the birds, said perch comprising a pair of substantially vertical side walls which extend outwardly from the housing adjacent opposite sides of the aperture with a rod extending between the walls on which a bird may light. In use, feed material within the feeder is easily accessible through the aperture to smaller birds located on the perch but not to larger birds since they cannot insert their relatively large heads between the side walls and their overall large size prevents them from curling their heads downwardly and forwardly to insert their beaks into the aperture.

8 Claims, 5 Drawing Figures

BIRD FEEDER PERCH

BACKGROUND OF THE INVENTION

The instant invention relates to bird feeders and the like and more particularly to a perch therefor.

The feeding of birds from feeders has gained popularity in recent years. Feeders of various configurations are available for various applications but regardless of their shape, conventional bird feeders are nearly always dominated by the larger more aggressive species of birds such as Bluejays, Starlings and Grackles. The instant invention overcomes this problem by providing a perch for bird feeders and the like which selectively excludes the larger more aggressive species of birds. Specifically, the feeder perch of the instant invention has a pair of spaced side walls which extend outwardly on either side of the feed aperture to make the aperture accessible to only the smaller species of birds. Larger birds such as Bluejays, Evening Grosbeaks, Pigeons, Mourning Doves, Starlings and Grackles are specifically excluded from the feeder since they cannot insert their relatively large heads into the aperture between the walls to gain access to the feed material. While they may attempt to feed from the perch, they quickly realize that it is impossible for them to do so and become discouraged thus leaving the feeder to the smaller birds. As a result, the smaller birds, such as Chickadees, Titmice, Finches, Pine Siskins, Red Polls and Nuthatches have the feeder to themselves.

SUMMARY OF THE INVENTION

The instant invention relates to a perch for bird feeders and the like and more particularly to a perch designed for selectively feeding the smaller, less aggressive species of birds.

The bird feeder perch of the instant invention is particularly adapted for mounting on the supporting surface of a bird feeder or the like. The perch has a main support member with an aperture therethrough, a pair of side walls which extend outwardly from the support members on opposite sides of the aperture, and a rod which extends between the side walls in substantially horizontal disposition. In use, when the perch is mounted on a feeder, a bird can land on the horizontal rod and insert its head between the side walls to feed from the feeder through the port or aperture. However, the aperture and the side walls are dimensioned and spaced to selectively permit feeding of only the smaller species of bird and as a result, large birds are unable to fit their relatively large heads between the walls to gain access to the feed material.

Furthermore, since the rod is spaced outwardly only a relatively short distance from the aperture, the only possible way that the larger birds can attempt to get at the feed material in the feeder is by curling their rather large heads downwardly and forwardly to insert their beaks into the aperture. However, it is physically impossible for the larger birds to contort their overall large bodies and necks in this manner; and, as a result, they either end up striking their heads on the supporting wall of the perch above the aperture or they end up with their beaks diverted more or less downwardly between their legs.

Accordingly, it is an object of the instant invention to provide a perch for bird feeders and the like which permits selective feeding of only the smaller species of birds.

Another object is to provide a bird feeder perch wherein a bird must insert his head between a pair of spaced side walls to gain access to feed material within a bird feeder.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
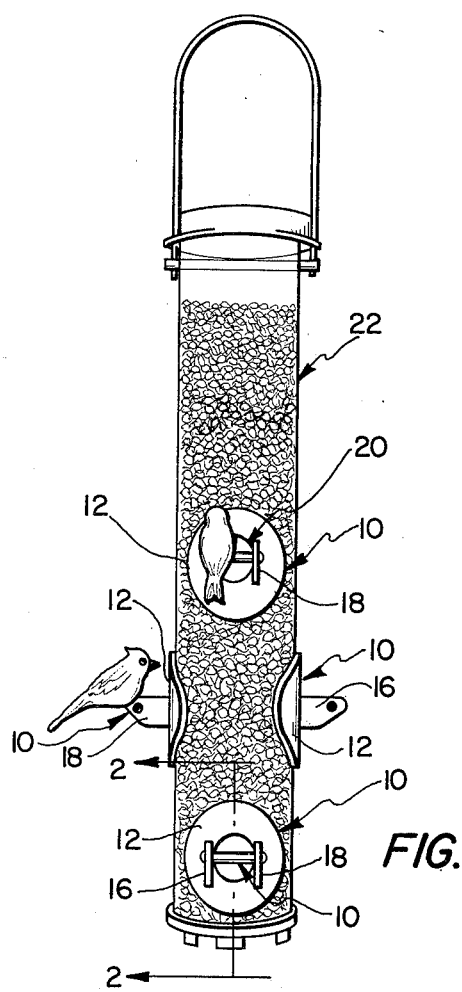
FIG. 1 is a perspective view of a bird feeder with a plurality of the perches of the instant invention mounted thereon.

Referring now to the drawing, the bird feeder perch of the instant invention is illustrated in FIGS. 1 through 4 and is generally indicated at 10. As will be noted, the perch 10 comprises generally a substantially vertical support member 12 having a centrally disposed port or aperture 14, a pair of spaced side walls 16 and 18 which extend outwardly from the member 12 on opposite sides of the aperture 14, a rod generally indicated at 20 which extends between the walls 16 and 18, and a baffle 19 which extends inwardly from the member 12.

Figure 3:
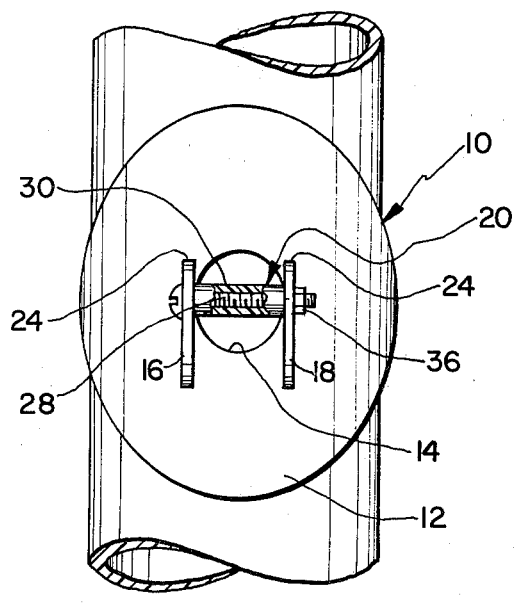
FIG. 3 is a front elevational view of one of the perches.
Figure 4:
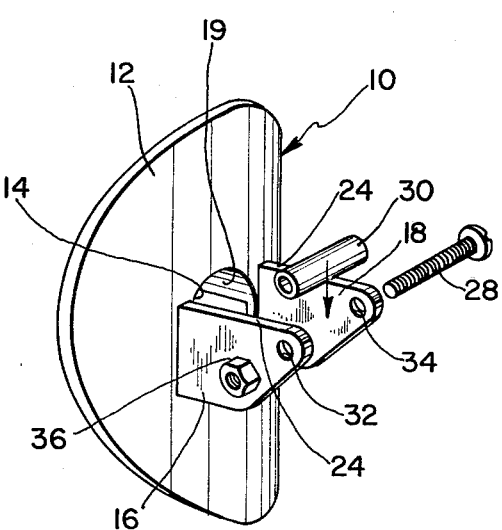
FIG. 4 is an exploded perspective view of the perch.

Referring to FIGS. 1, 3 and 4, it will be noted that the perch 10, as herein embodied, is particularly adapted for use on a vertical cylindrically shaped tubular feeder 22 of the type generally disclosed in applicant's prior U.S. Pat. No. 3,568,641. The support member 12, as will be noted, is of generally circular configuration, being disposed substantially vertically and being curved rearwardly to conform to the curvature of feeder 22 whereby the perch 10 may be mounted on the feeder with the rear surface of the member 12 abutting the outer surface of the feeder. The aperture 14 is substantially circular and centrally disposed on the member 12 and the side walls 16 and 18 extend outwardly therefrom adjacent to the periphery of the aperture 14 on opposite sides thereof. As will be noted, the side walls 16 and 18 are substantially parallel and are vertically disposed being generally of the configuration show, i.e., having substantially horizontal upper edges 24, downwardly and inwardly inclined edges 25 and horizontal bottom edges 26. The member 12, the walls 16 and 18 and the baffle 19 may be made of any suitable durable material but are preferably of unitary construction cast of a corrosion resistant metal such as aluminum. The bar 20 comprising a conventional machine screw 28, having a tubular plastic sleeve 30 extending thereover, said screw extending between the outer ends of the walls 16 and 18 and being received in holes 32 and 34 respectively. A threaded nut 36 is provided in threaded engagement with the free end of the machine screw 28 securing it in position. The sleeve 30 provides a more comfortable surface for the birds to light on.

Figure 2:
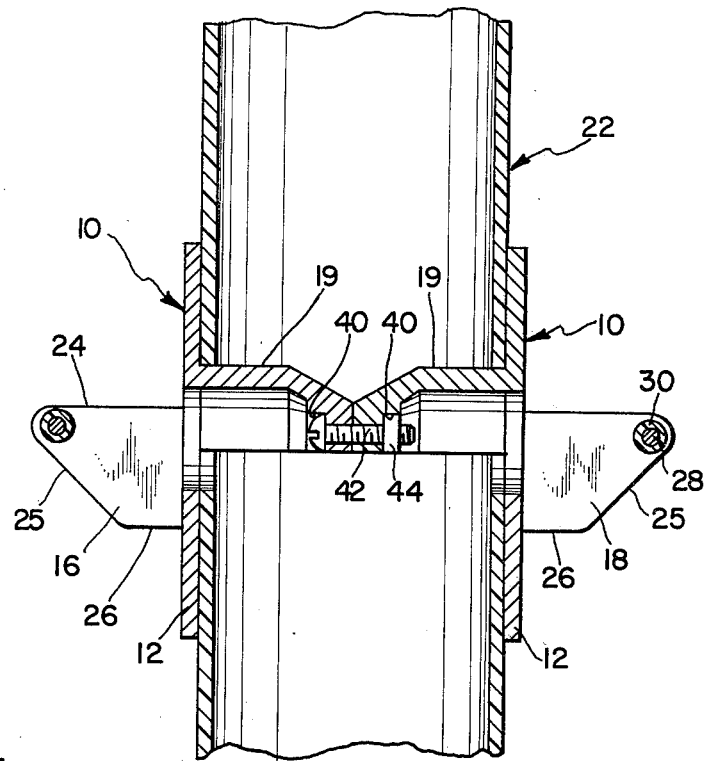
FIG. 2 is a side sectional view of a perch taken along line 2—2 of FIG. 1.

As may be noted most clearly from FIG. 2, the baffle 19 extends inwardly from the member 12 adjacent to the upper periphery of the aperture 14. The baffle 19 is of substantially arcuate configuration following the upper periphery of the aperture 14 and extending inwardly therefrom to the axial center of the feeder 22.

As will be noted from FIG. 2, a pair of the perches 10 are mountable on opposite sides of the feeder 22 with the baffles 19 providing the means for securing the perches 10 thereto. An inner recess 40 is provided on the inner ends of each of the baffles 19 as shown and a threaded machine screw 42 and a threaded nut 44 are provided to secure opposed perches 10 together and hence to the feeder 22.

It will be noted that the baffle 19 operates in a similar manner to the baffle disclosed in applicant's prior U.S. Pat. No. 3,568,641, maintaining a level of feed material adjacent to the lower periphery of the aperture 14 but preventing the feed material from freely flowing outwardly therethrough. As birds feed from the feeder 22, the feed material therewithin gradually descends around the baffles 19. However, the baffles 19, in cooperation with the natural friction between the feed particles in the feeder, prevent the feed material from flowing freely out through the apertures 14.

Since the main object of the perch of the instant invention is to allow birds of a particular size to feed from the feeder 22 while excluding larger birds, the dimensions and positions of the aperture 14, the side walls 16 and 18, and the rod 20 are of particular significance. While it is understood that the perch of the instant invention can be constructed with various dimensions for preferential feeding of birds of various sizes, the embodiment herein described is particularly directed to the feeding of Chickadees, Titmice, Finches, Woodpeckers, Pine Siskins, Red Polls, and the like excluding the larger species of birds such as Bluejays, Evening Grosbeaks, Pigeons, Mourning Doves, Starlings and Grackles. Therefore, the preferred diametric dimension of the aperture 14 is approximately ⅞ inches with the side walls 16 and 18, which are disposed adjacent to opposite sides of the aperture being accordingly spaced. Furthermore, the top edges 24 of the side walls are preferably disposed in a horizontal plane which intersects the aperture 14 at approximately 3/16 inches below its upper periphery. The rod 20 is spaced approximately 1 inch outwardly from the support member 12 with the central axis thereof being disposed in a horizontal plane which intersects the aperture 14 substantially at its horizontal diameter or midpoint.

In use, a bird detects the presence of feed material in the feeder 22 and lands grasping the rod 20 with its feet. The plastic sleeve 30 protects the feet of the bird and prevents them from being frozen to the rod 20 during cold weather.

Figure 5:
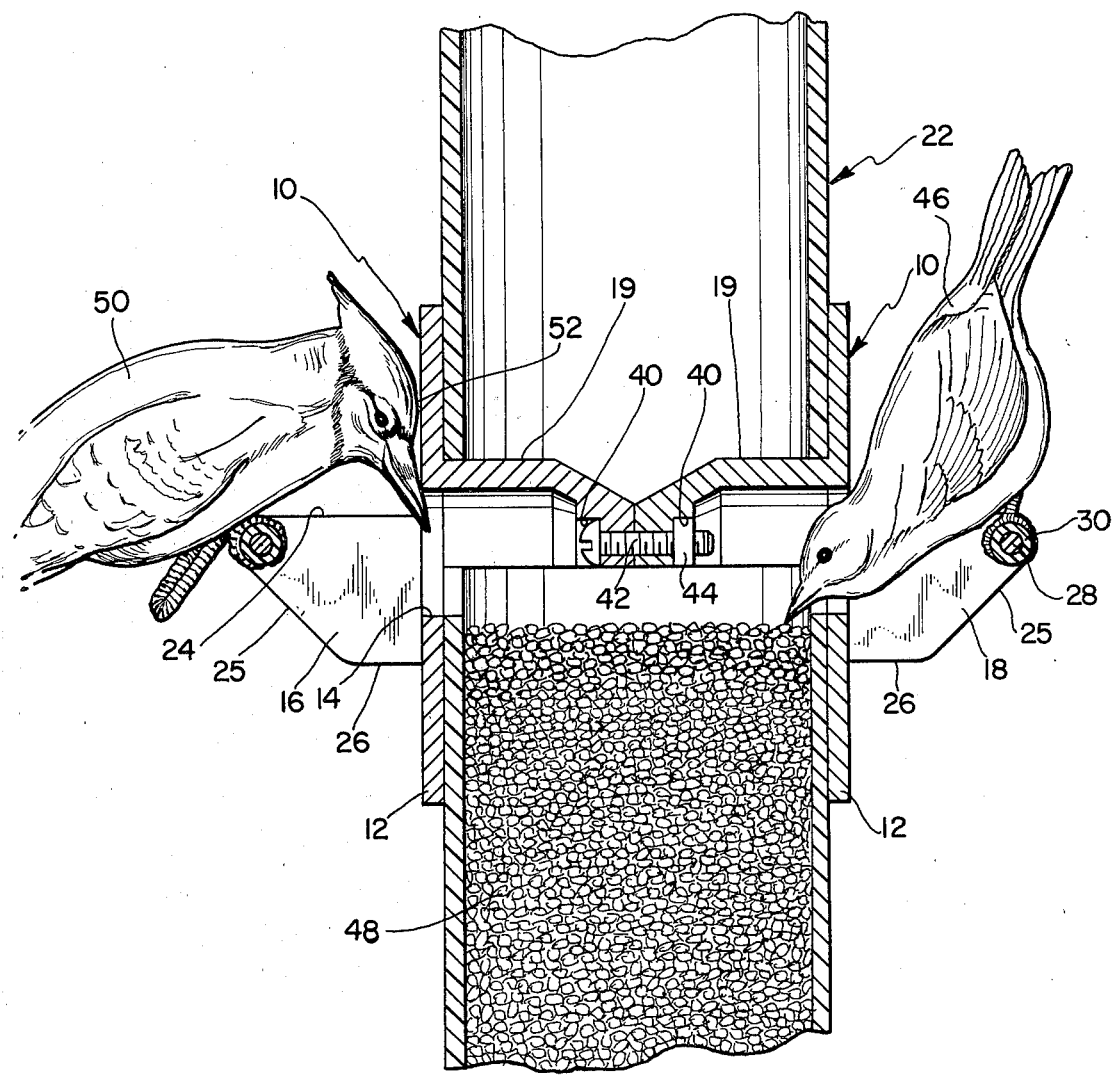
FIG. 5 is a full size side sectional view of the perch particularly illustrating the functioning thereof to selectively exclude the larger birds.

In order to feed from the feeder 22, the bird must insert its head between the side walls and feed from the feeder through the aperture 14. However, since the side walls 16 and 18, the aperture 14 and the rod 20 are dimensioned and positioned to exclude larger birds, the feed material within the feeder 22 is only accessible to small birds. The cooperation of these elements to cause the perch to act in this manner will be particularly noted from FIG. 5. As will be thereseen, a smaller bird 46 can easily gain access to feed material 48 in the feeder 22 simply by tilting its body and inserting its head through the aperture 14. On the other hand, such a maneuver is virtually impossible for a larger bird 50. As will be noted, as the bird 50 attempts to get at the feed material 48, the overall length of its upper body and neck, as well as the size of its head, causes the bird 50 to strike its head on the support member 12 above the aperture 14 as at 52 making the feed material 48 inaccessible to the bird 50. While the bird 50 may also attempt to gain access to the material 48 by contorting its neck and upper body by curling its head downwardly to clear the top of the aperture 14, this merely results in the beak of the bird 50 being directed downwardly away from the aperture 14.

Obviously therefore, while larger birds may attempt to feed from the feeder 22, the spacing and positioning of the walls 16 and 18 and the rod 20 prevents them from inserting their heads into the aperture 14. As a result, the larger birds quickly become frustrated with their inability to feed from the feeder 22 and leave to search for food elsewhere. Small birds on the other hand, which can easily insert their heads between the walls 16 and 18, have easy access to the apertures 14 to feed from the feeder 22.

Where there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A perch for bird feeders and the like comprising:
  a. a substantially vertical support member which is mountable on a supporting surface with an aperture extending therethrough;
  b. a pair of substantially parallel spaced side walls extending outwardly in substantially vertical disposition from said support member adjacent to the periphery of said aperture on opposite sides thereof:
  c. a substantially horizontal rod extending between said walls spaced outwardly from said support member; and
  d. the spacing between said side walls being such as to permit smaller birds to gain access to said aperture, while preventing such access by larger birds.

2. In the perch of claim 1, said walls being spaced approximately ⅞ inches apart.

3. In the perch of claim 2, said aperture being substantially circular and of approximately ⅞ inches diameter.

4. In the perch of claim 3, the top edges of said side walls being substantially horizontal and defining a plane which intersects said aperture at approximately 3/16 inches below its upper periphery.

5. In the perch of claim 4, said rod being spaced outwardly approximately 1 inch from said support member.

6. In the perch of claim 1, said rod being substantially cylindrical, the axis of said rod being disposed in a horizontal plane which intersects said aperture substantially at its horizontal diameter.

7. The perch of claim 1, further comprising baffle means attached to the inner side of said support member adjacent to said aperture for maintaining a level of feed material adjacent to said aperture without flowing therethrough when said perch is mounted on a bird feeder containing a feed material.

8. In the perch of claim 7, said vertical support member, said side walls and said baffle means comprising a unitary, one-piece assembly.

* * * * *